United States Patent
Jin

(10) Patent No.: US 9,869,850 B2
(45) Date of Patent: Jan. 16, 2018

(54) VARIABLE-MAGNIFICATION OBSERVATION OPTICAL SYSTEM

(71) Applicant: KONICA MINOLTA, INC., Chiyoda-ku (JP)

(72) Inventor: Makoto Jin, Sakai (JP)

(73) Assignee: Konica Minolta, Inc., Tokyo (JP)

( * ) Notice: Subject to any disclaimer, the term of this patent is extended or adjusted under 35 U.S.C. 154(b) by 85 days.

(21) Appl. No.: 14/888,895

(22) PCT Filed: May 1, 2014

(86) PCT No.: PCT/JP2014/062060
§ 371 (c)(1),
(2) Date: Nov. 3, 2015

(87) PCT Pub. No.: WO2014/181749
PCT Pub. Date: Nov. 13, 2014

(65) Prior Publication Data
US 2016/0077317 A1 Mar. 17, 2016

(30) Foreign Application Priority Data
May 8, 2013 (JP) .................. 2013-098171

(51) Int. Cl.
*G02B 15/14* (2006.01)
*G02B 15/163* (2006.01)
(Continued)

(52) U.S. Cl.
CPC ........... *G02B 15/163* (2013.01); *G02B 13/18* (2013.01); *G02B 23/2423* (2013.01); *G02B 25/001* (2013.01); *G02B 27/0025* (2013.01)

(58) Field of Classification Search
CPC . G02B 9/00; G02B 9/60; G02B 13/00; G02B 13/0015; G02B 13/002;
(Continued)

(56) References Cited

U.S. PATENT DOCUMENTS 5,371,626 A * 12/1994 Betensky ............... G02B 23/00
359/375
5,504,624 A 4/1996 Kato
(Continued)

FOREIGN PATENT DOCUMENTS

CN 1226010 8/1999
JP 4-204614 7/1992
(Continued)

OTHER PUBLICATIONS

Office Action dated Jan. 26, 2017 which issued in the corresponding Chinese Patent Application No. 201480025504.7.

*Primary Examiner* — Thong Nguyen
(74) *Attorney, Agent, or Firm* — Cozen O'Connor

(57) ABSTRACT

A variable-magnification observation optical system includes an objective system, an erecting system, and an eyepiece system. The objective system includes a positive first group, a positive second group, and a negative third group in order from the object side. The eyepiece system includes a positive fourth group and a positive fifth group in order from the object side. The erecting system is located between the first group and the second group. The fifth group includes in order from the object side a negative meniscus lens and a positive lens with an air gap therebetween wherein the negative meniscus lens has a concave surface facing the object. The fifth group has at least one aspheric surface.

20 Claims, 12 Drawing Sheets

EX1

(51) Int. Cl.
  *G02B 25/00* (2006.01)
  *G02B 13/18* (2006.01)
  *G02B 23/24* (2006.01)
  *G02B 27/00* (2006.01)

(58) Field of Classification Search
  CPC .... G02B 13/0045; G02B 15/00; G02B 15/14; G02B 15/16; G02B 15/167; G02B 15/20; G02B 23/00; G02B 23/02; G02B 23/12; G02B 23/14; G02B 23/145; G02B 25/00; G02B 25/001
  See application file for complete search history.

(56) References Cited

U.S. PATENT DOCUMENTS

| | | | |
|---|---|---|---|
| 5,920,426 A * | 7/1999 | Neil | G02B 23/14 359/428 |
| 6,094,310 A * | 7/2000 | Hankawa | G02B 25/001 359/643 |
| 6,577,449 B1 | 6/2003 | Kanai | |
| 8,537,262 B2 * | 9/2013 | Betensky | G02B 7/12 348/333.01 |
| 2004/0095642 A1* | 5/2004 | Watanabe | G02B 7/06 359/407 |
| 2016/0170188 A1* | 6/2016 | Jin | G02B 25/001 359/432 |

FOREIGN PATENT DOCUMENTS

| | | |
|---|---|---|
| JP | 2000-214384 | 8/2000 |
| JP | 2001-318323 | 11/2001 |
| JP | 2003-315687 | 11/2003 |
| JP | 2005-283772 | 10/2005 |
| JP | 2012-252241 | 12/2012 |

* cited by examiner

EX3

EX1

EX2

EX3

EX4

(A) EX1, W

SPHERICAL ABERRATION (Dpt)

(B) EX1, W

ASTIGMATISM (Dpt)

(C) EX1, W

DISTORTION ABERRATION (%)

(D) EX1, T

SPHERICAL ABERRATION (Dpt)

(E) EX1, T

ASTIGMATISM (Dpt)

(F) EX1, T

DISTORTION ABERRATION (%)

(A) EX2, W

SPHERICAL ABERRATION (Dpt)

(B) EX2, W

ASTIGMATISM (Dpt)

(C) EX2, W

DISTORTION ABERRATION (%)

(D) EX2, T

SPHERICAL ABERRATION (Dpt)

(E) EX2, T

ASTIGMATISM (Dpt)

(F) EX2, T

DISTORTION ABERRATION (%)

(A) EX3, W

SPHERICAL ABERRATION (Dpt)

(B) EX3, W

ASTIGMATISM (Dpt)

(C) EX3, W

DISTORTION ABERRATION (%)

(D) EX3, T

SPHERICAL ABERRATION (Dpt)

(E) EX3, T

ASTIGMATISM (Dpt)

(F) EX3, T

DISTORTION ABERRATION (%)

VARIABLE-MAGNIFICATION OBSERVATION OPTICAL SYSTEM

RELATED APPLICATIONS

This is a U.S. National stage of International application No. PCT/JP2014/062060 filed on May 1, 2014.

This patent application claims the priority of Japanese application no. 2013-098171 filed May 8, 2013 the disclosure content of which is hereby incorporated by reference.

TECHNICAL FIELD

The present invention relates to variable-magnification observation optical systems, and relates to, for example, a variable-magnification observation optical system used in medical loupes, work loupes, binoculars, terrestrial telescopes, and the like.

BACKGROUND ART

Observation optical systems used in loupes, binoculars, and terrestrial telescopes, and the like have been generally Keplerian-type (real image-type) optical systems, in which an inverted image formed by an objective system is inverted into an erect image by an erecting system such as prism and the image is observed through an eyepiece system. Since zoom optical systems with a magnification ratio of about 2 times are easily downsized, the zoom type involving zooming the inverted image with a pair of lenses that sandwich the inverted image is generally employed as proposed in Patent Literature 1.

For example, in Example 1 of Patent Literature 1, one of moving groups includes a doublet lens and another moving group includes a doublet lens and a positive lens to correct aberration variation during variation of magnification in the moving groups, and a fixed group includes a single lens. In Example 2 of Patent Literature 1, the group closest to the pupil in the eyepiece system includes a doublet lens to correct axial chromatic aberration.

CITATION LIST

Patent Literature

Patent Literature 1: JP 2003-315687 A

In Example 1 of Patent Literature 1, the moving groups have increased weight and a complex mechanical structure since the moving groups include multiple lenses. Thus, it is difficult to reduce the weight of the entire unit. In Example 2 of Patent Literature 1, the group closest to the pupil in the eyepiece system includes only a pair of doublet lenses, which makes it difficult to simultaneously and satisfactorily correct aberrations at the center and the periphery.

SUMMARY OF INVENTION

The present invention has been made in view of such circumstances. An object of the present invention is to provide a light, compact variable-magnification observation optical system that satisfactorily corrects various aberrations throughout the field from the center to the periphery.

To achieve the above object, a variable-magnification observation optical system according to a first embodiment of the invention is a variable-magnification observation optical system including:

an objective system;

an erecting system that erects an inverted image formed by the objective system; and an eyepiece system that allows the erect image formed by the erecting system to be observed through a pupil, wherein the objective system includes a first group having positive power, a second group having positive power, and a third group having negative power in order from the object side, the eyepiece system includes a fourth group having positive power and a fifth group having positive power in order from the object side, the erecting system is located between the first group and the second group, zooming from a low magnification end to a large magnification end involves moving the third group and the fourth group in opposite directions along an optical axis while locating an image plane between the third group and the fourth group, the fifth group includes in order from the object side a negative meniscus lens and a positive lens with an air gap therebetween, the negative meniscus lens having a concave surface facing the object, and the fifth group has at least one aspheric surface.

A variable-magnification observation optical system according to a second embodiment of the invention is the first embodiment of the invention wherein the second group and the third group each include a single lens.

A variable-magnification observation optical system according to a third embodiment of the invention is the first or second embodiment of the invention wherein the fourth group includes only a positive lens.

A variable-magnification observation optical system according to a fourth embodiment of the invention is any one of the first to third embodiments of the inventions which satisfies conditional equation (1):

$$0.2 < LT5/\text{few} < 0.3 \quad (1)$$

wherein

LT5: the distance on the optical axis between the pupil-side surface of a lens 5-1 and the object-side surface of a lens 5-2, provided that the negative meniscus lens in the fifth group is referred to as the lens 5-1 and the positive lens in the fifth group as the lens 5-2, few: the focal length of the eyepiece system at the low magnification end.

A variable-magnification observation optical system according to a fifth embodiment of the invention is any one of the first to fourth embodiments of the inventions which satisfies conditional equation (2):

$$0.5 < f4/\text{few} < 0.8 \quad (2)$$

wherein f4: the focal length of the fourth group, few: the focal length of the eyepiece system at the low magnification end.

A variable-magnification observation optical system according to a sixth embodiment of the invention is any one of the first to fifth embodiments of the inventions which satisfies conditional equation (3):

$$0.5 < (Rb+Ra)/(Rb-Ra) < 3.5 \quad (3)$$

wherein

Ra: the radius of curvature of the object-side surface of the lens 5-1,

Rb: the radius of curvature of the pupil-side surface of the lens 5-1, provided that the negative meniscus lens in the fifth group is defined as the lens 5-1.

A variable-magnification observation optical system according to a seventh embodiment of the invention is any one of the first to sixth embodiments of the inventions which satisfies conditional equation (4):

$$0.4 < f34t/f34w < 0.8 \quad (4)$$

wherein f34w: the composite focal length of the third group and the fourth group at the low magnification end, f34t: the composite focal length of the third group and the fourth group at the high magnification end.

A variable-magnification observation optical system according to an eighth embodiment of the invention is any one of the first to seventh embodiments of the inventions wherein the first, second, and fifth groups are fixed in the optical axis direction during zooming.

Advantageous Effects of Invention

The present invention can achieve a light, compact variable-magnification observation optical system that satisfactorily corrects various aberrations throughout the field from the center to the periphery.

DESCRIPTION OF EMBODIMENTS

Figure 1:
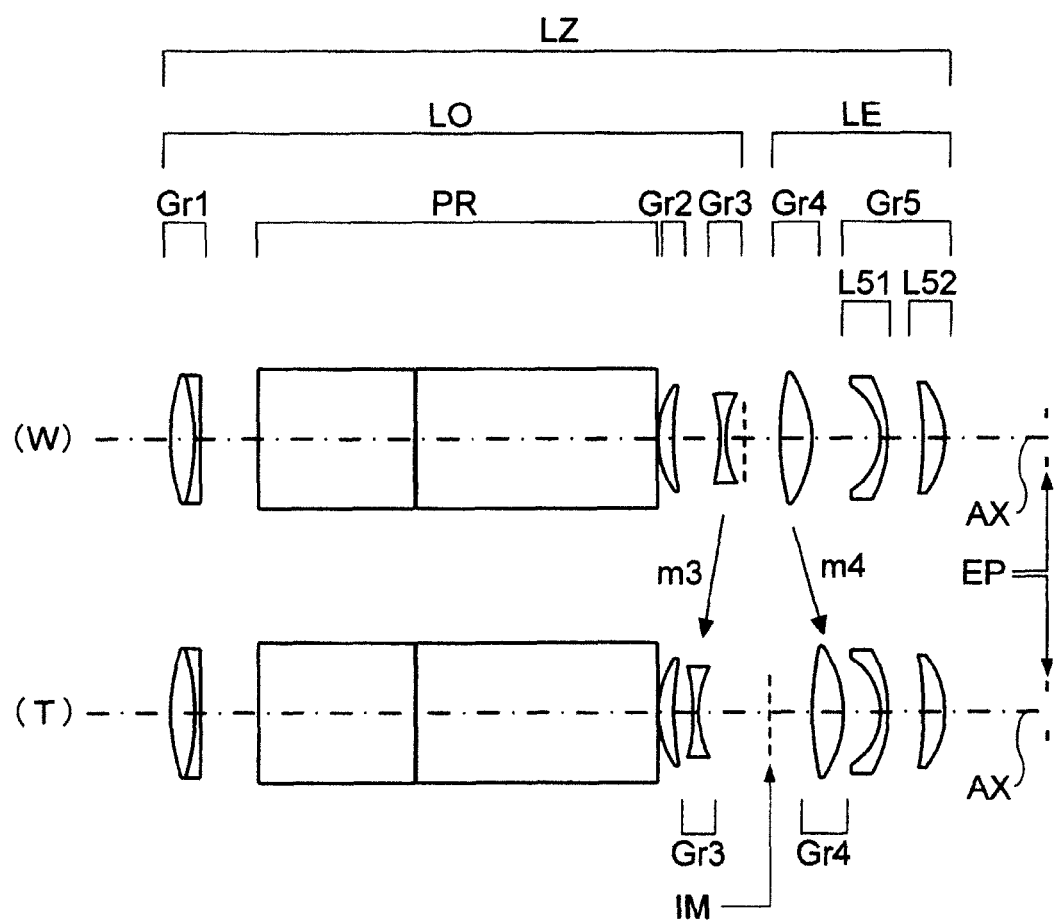
FIG. 1 is an optical diagram according to the first embodiment (Example 1).

A variable-magnification observation optical system according to the present invention is described below. The variable-magnification observation optical system according to the present invention is a real image-type observation optical system including:

an objective system;

an erecting system that erects an inverted image formed by the objective system; and an eyepiece system that allows the erect image formed by the erecting system to be observed through the pupil, wherein the objective system includes a first group having positive power, a second group having positive power, and a third group having negative power in order from the object side, the eyepiece system includes a fourth group having positive power and a fifth group having positive power (power: the amount defined as the reciprocal of a focal length) in order from the object side, and the erecting system is located between the first group and the second group.

Zooming from the low magnification end to the large magnification end involves moving the third group and the fourth group in opposite directions along the optical axis while locating an image plane between the third group and the fourth group. The fifth group includes in order from the object side a negative meniscus lens having a concave surface facing an object and a positive lens wherein the negative meniscus lens is spaced from the positive lens with an air gap therebetween. The fifth group has at least one aspheric surface.

Real image-type observation optical systems including an objective system, an erecting system, and an eyepiece system have an advantage of reduced diameter of the objective system as compared to the virtual image type. Disposing the second group having positive power at the pupil-side of the erecting system allows the conjugate position of the pupil to be located in the erecting system or near the erecting system. This results in a narrow width of light passing through the erecting system and thus makes the erecting system compact, reducing the entire observation optical system in weight and size. The magnification can be varied without increasing the full length by employing the zoom configuration in which the third group and the fourth group are moved in opposite directions with an image plane intervening between the groups.

The effect of correcting the axial chromatic aberration is obtained by disposing negative/positive lenses in the fifth group. The effect of satisfactorily correcting the spherical aberration and the like is obtained by disposing a negative meniscus lens (lens 5-1) having a concave surface facing an object and a positive lens (lens 5-2) with an air gap therebetween (without contact). Furthermore, the effect of satisfactorily correcting aberrations not only on the axis but also out of the axis, such as curvature of field, is obtained by providing at least one aspheric surface in the fifth group.

Therefore, the above characteristic configuration can achieve a light, compact variable-magnification observation optical system while satisfactorily correcting various aberrations throughout the field from the center to the periphery. The conditions and the like for obtaining such effects in a well-balanced manner while achieving, for example, higher optical performance and downsizing will be described below.

The second group and the third group each desirably include a single lens. The use of a single lens is effective for reducing the weight and preventing an increase in the full length. For example, when the second group and the third group each include a single lens, an increase in the full length can be effectively prevented. When the third group movable in zooming includes a single lens, lens driving load can be reduced because of the reduced weight of the third group. In addition, since structural members can be reduced in size and weight, the effects of simplifying the zoom mechanism and preventing an increase in weight are obtained.

The fourth group desirably includes only a positive lens. When the fourth group movable in zooming includes only a positive lens, the astigmatism and coma aberration can be satisfactorily corrected throughout the zoom range.

It is desirable to satisfy conditional equation (1):

$$0.2 < LT5/few < 0.3 \quad (1)$$

wherein

LT5: the distance on the optical axis between the pupil-side surface of a lens 5-1 and the object-side surface of a lens 5-2, provided that the negative meniscus lens in the fifth group is defined as the lens 5-1 and the positive lens in the fifth group as the lens 5-2, few: the focal length of the eyepiece system at the low magnification end.

The aberration is corrected by using different regions of the lens 5-1 for the luminous flux on the axis and the luminous flux at the periphery. To correct the aberration in such a way, the lens 5-1 and the lens 5-2 need to be disposed at a certain or wider interval. The LT5/few over the upper limit in the conditional equation (1) results in a long distance of the fifth group, which makes difficult downsizing of the entire optical system. The LT5/few below the lower limit in the conditional equation (1) results in a short distance between the lens 5-1 and the lens 5-2, which makes it difficult to use different regions of the lens 5-1 for the luminous flux on the axis and the luminous flux at the periphery. As a result, this causes difficulty with good simultaneous and satisfactory correction of aberrations on the axis and at the periphery. Therefore, satisfying the conditional equation (1) can achieve downsizing and improved performance of the observation optical system in a well-balanced manner.

It is more desirable to satisfy conditional equation (1a):

$$0.23 < LT5/few < 0.26 \tag{1a}$$

This conditional equation (1a) defines a more preferred condition range based on the above points of view and the like in the condition range defined by the conditional equation (1). Therefore, it is preferred that satisfying the conditional equation (1a) can improve the above effects.

It is desirable to satisfy conditional equation (2):
variable-magnification observation optical system;

$$0.5 < f4/few < 0.8 \tag{2}$$

wherein f4: the focal length of the fourth group, few: the focal length of the eyepiece system at the low magnification end.

The f4/few over the upper limit in the conditional equation (2) reduces the relative power of the fourth group and thus increases the movement of the fourth group in zooming. It is accordingly difficult to downsize the optical system. The f4/few below the lower limit in the conditional equation (2) increases the astigmatism, coma aberration, and the like that occur in the fourth group, which are difficult to satisfactorily correct in the fifth group. Therefore, satisfying the conditional equation (2) can achieve downsizing and improved performance of the observation optical system in a well-balanced manner.

It is more desirable to satisfy conditional equation (2a):

$$0.6 < f4/few < 0.7 \tag{2a}$$

This conditional equation (2a) defines a more preferred condition range based on the above points of view and the like in the condition range defined by the conditional equation (2). Therefore, it is preferred that satisfying the conditional equation (2a) can improve the above effects.

It is desirable to satisfy conditional equation (3):

$$0.5 < (Rb+Ra)/(Rb-Ra) < 3.5 \tag{3}$$

wherein

Ra: the radius of curvature of the object-side surface of the lens 5-1,

Rb: the radius of curvature of the pupil-side surface of the lens 5-1, provided that the negative meniscus lens in the fifth group is defined as the lens 5-1.

The conditional equation (3) defines a preferred condition range for the features of the surfaces of the lens 5-1. The (Rb+Ra)/(Rb−Ra) over the upper limit in the conditional equation (3) results in a higher position of light passing through the lens 5-1, increasing the diameter of the lens in the fifth group to make it difficult to reduce the observation optical system in size and weight. The (Rb+Ra)/(Rb−Ra) below the lower limit in the conditional equation (3) increase the curvature of the object-side surface, which makes it difficult to process the surface. Therefore, satisfying the conditional equation (3) can achieve reduced weight and size and improved performance of the observation optical system in a well-balanced manner. The features of the surfaces are expressed on the basis of paraxial curvature.

It is more desirable to satisfy conditional equation (3a):

$$0.9 < (Rb+Ra)/(Rb-Ra) < 3 \tag{3a}$$

This conditional equation (3a) defines a more preferred condition range based on the above points of view and the like in the condition range defined by the conditional equation (3). Therefore, it is preferred that satisfying the conditional equation (3a) can improve the above effects.

It is desirable to satisfy conditional equation (4):

$$0.4 < f34t/f34w < 0.8 \tag{4}$$

wherein f34w: the composite focal length of the third group and the fourth group at the low magnification end, f34t: the composite focal length of the third group and the fourth group at the high magnification end, The f34t/f34w over the upper limit in the conditional equation (4) reduces the contribution of the fourth group in zooming to increase the contribution of the third group. An increased movement of the third group makes achievement of downsizing difficult. Conversely, the f34t/f34w below the lower limit in the conditional equation (4) relatively increases the contribution of the fourth group in zooming to increase the movement of the fourth group, which makes achievement of downsizing difficult. Therefore, satisfying the conditional equation (4) enables downsizing of the observation optical system while maintaining high optical performance.

It is more desirable to satisfy conditional equation (4a):

$$0.5 < f34t/f34w < 0.7 \tag{4a}$$

This conditional equation (4a) defines a more preferred condition range based on the above points of view and the like in the condition range defined by the conditional equation (4). Therefore, it is preferred that satisfying the conditional equation (4a) can improve the above effects.

The first, second, and fifth groups are desirably fixed in the optical axis direction during zooming. The zoom mechanism can be simplified by making only two groups, the third and fourth groups, movable. Therefore, the fact that the first, second, and fifth groups are fixed groups provides an effect of preventing an increase in weight of the entire unit. In addition, the fact that the first and fifth groups facing outside are fixed groups can form a variable-magnification observation optical system having an advantage of a waterproof and dustproof structure.

The third group desirably has at least one aspheric surface. Providing at least one aspheric surface in the third group can control the peripheral luminous flux throughout the zoom range. Therefore, this enables satisfactory correction of the curvature of field throughout the zoom range.

A glass lens having an aspheric surface may be molded, or of course may be formed as a complex of glass materials and resin materials. The mold type is suitable for mass production, but limits glass materials. On the other hand, the complex type employs numerous types of glass materials as a substrate, and thus have an advantage of high design degree of freedom. Since it is normally difficult to mold an aspheric lens including a high refractive material, an aspheric lens having an aspheric surface at one side takes full advantage of the benefits of the complex type.

The lens closest to an object and the lens closest to the pupil are desirably made of glass materials. Since lens surfaces exposed to outside are often uncovered in, for example, manufacturing sites, inspection processes, and medical practices, and outdoors, frequent attachment/detachment tends to place a load on the lenses closest to the pupil and an object. From such a point, the lenses closest to the pupil and an object, which require, for example, robustness, chemical resistance, and water resistance, are desirably made of glass materials.

The lens closest to an object is desirably made of a glass material that satisfies conditional equation (5):

$$DA1 < 0.35 \quad (5)$$

wherein

DA1: the value of acid resistant calculated as decrease (%) in the mass of powder of the glass material after the powder is placed in a 0.01 mol/l aqueous solution of nitric acid and heated in a bath of boiling water.

The conditional equation (5) defines preferred acid resistance as glass materials used for the lens closest to an object. For example, in medical applications or the like, glass materials need to be less affected by attachment of chemicals, i.e., need to have acid resistance. When the lens closest to an object is made of a glass material that satisfies the conditional equation (5), the decrease in optical properties due to attachment of chemicals or the like can be prevented. The DA1 over the upper limit in the conditional equation (5) may cause chemical reactions, such as staining, to degrade optical properties when the uncovered lens closest to an object is exposed to external environment. The above value and measurement method, and the values corresponding to the following conditional equations are based on the data described in the optical glass catalog from Hoya Corporation or the optical glass catalog from Sumita Optical Glass, Inc.

The lens closest to an object desirably satisfies any or all of conditional equations (6) and (7):

$$Hk1 > 350 \quad (6)$$

$$DS1 < 0.2 \quad (7)$$

wherein

Hk1: Knoop hardness,

DS1: the decrease in mass per unit area [mg/(cm$^2$·h)] of a glass sample of 43.7 mm in diameter (total surface area 30 cm$^2$) and about 5 mm in thickness that is polished on both surfaces when the glass sample is immersed for 1 hours in a 0.01 mol/l aqueous solution of Na$_5$P$_3$O$_{10}$ at 50° C. that is well stirred.

The conditional equation (6) defines preferred Knoop hardness of the lens closest to an object; and the conditional equation (7) defines preferred latent scratch resistance of the lens closest to an object. Since glass materials that satisfy the conditional equations (6) and (7) are excellent in these various properties, the lens closest to an object includes a glass lens that satisfies at least one of the conditional equations (6) and (7) to solve the above problems. The above value and measurement method, and the values corresponding to the following conditional equations are based on the data described in the optical glass catalog from Hoya Corporation or the optical glass catalog from Sumita Optical Glass, Inc.

Figure 2:
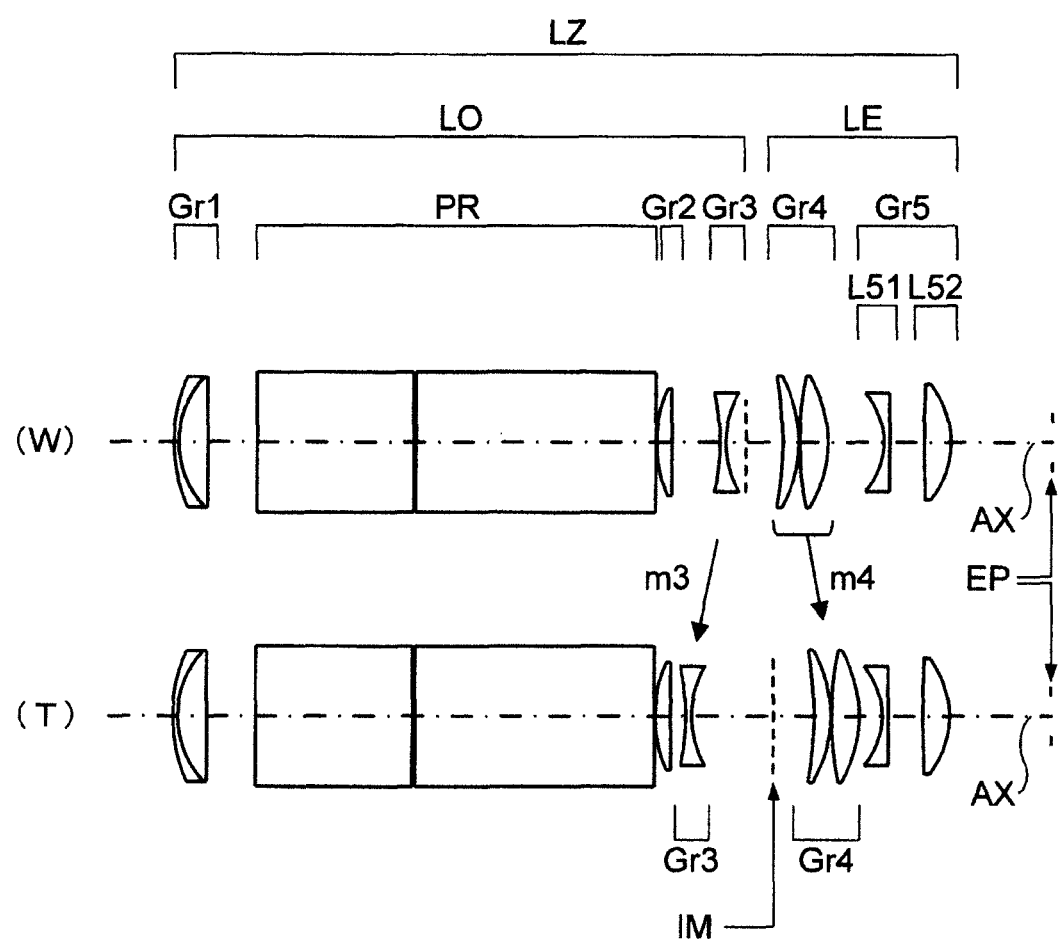
FIG. 2 is an optical diagram according to the second embodiment (Example 2).
Figure 3:
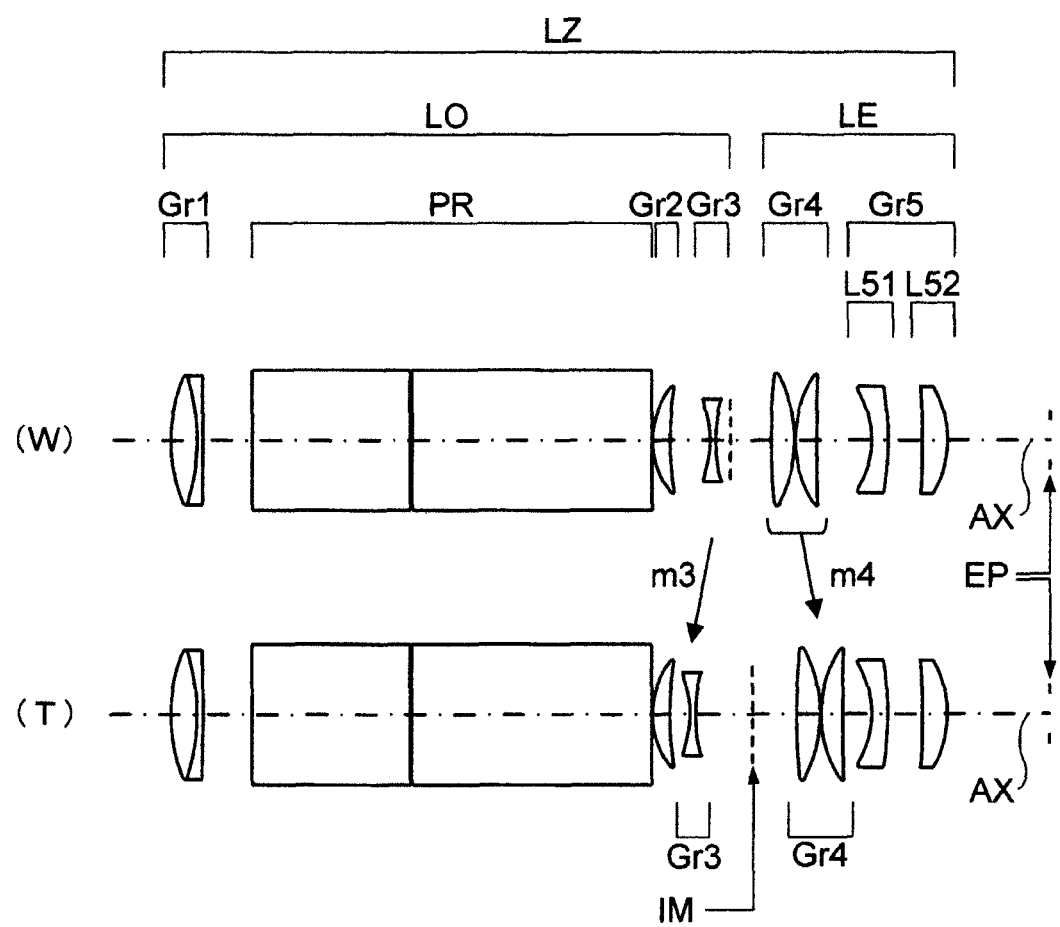
FIG. 3 is an optical diagram according to the third embodiment (Example 3).
Figure 4:
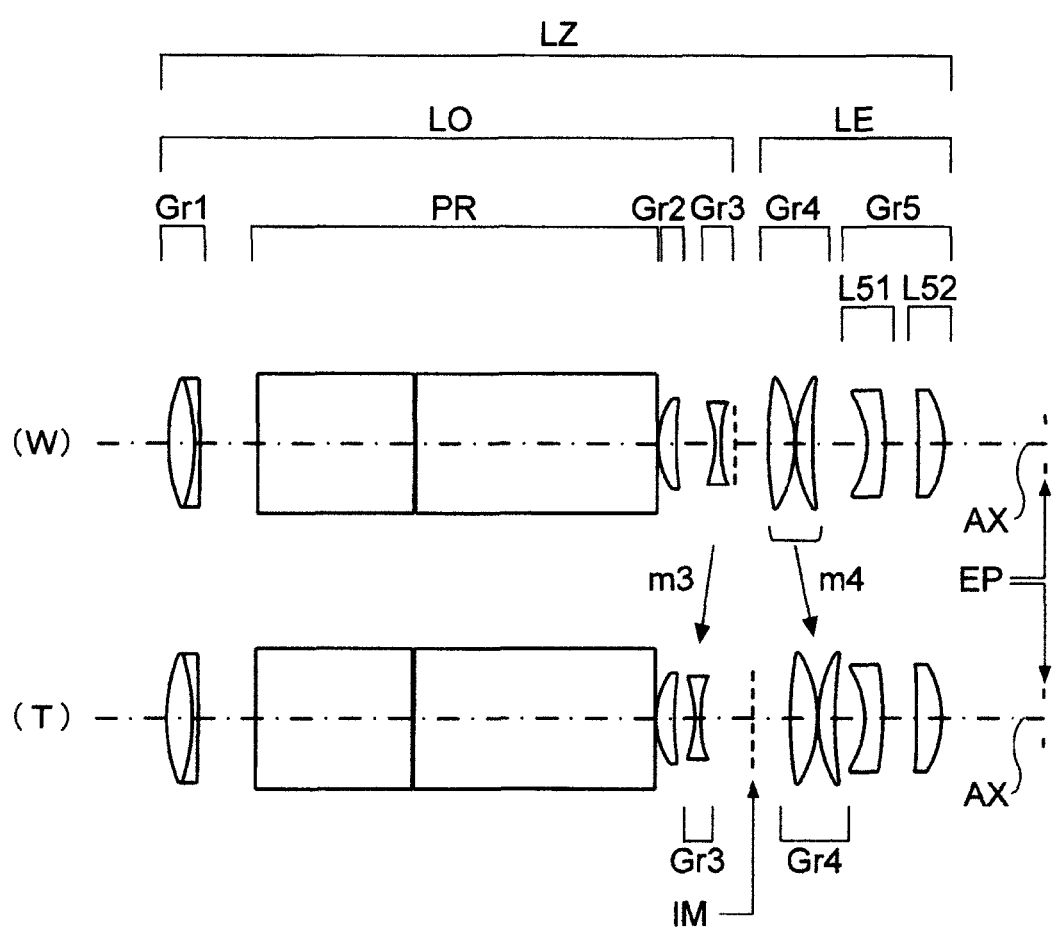
FIG. 4 is an optical diagram according to the fourth embodiment (Example 4).
Figure 5:
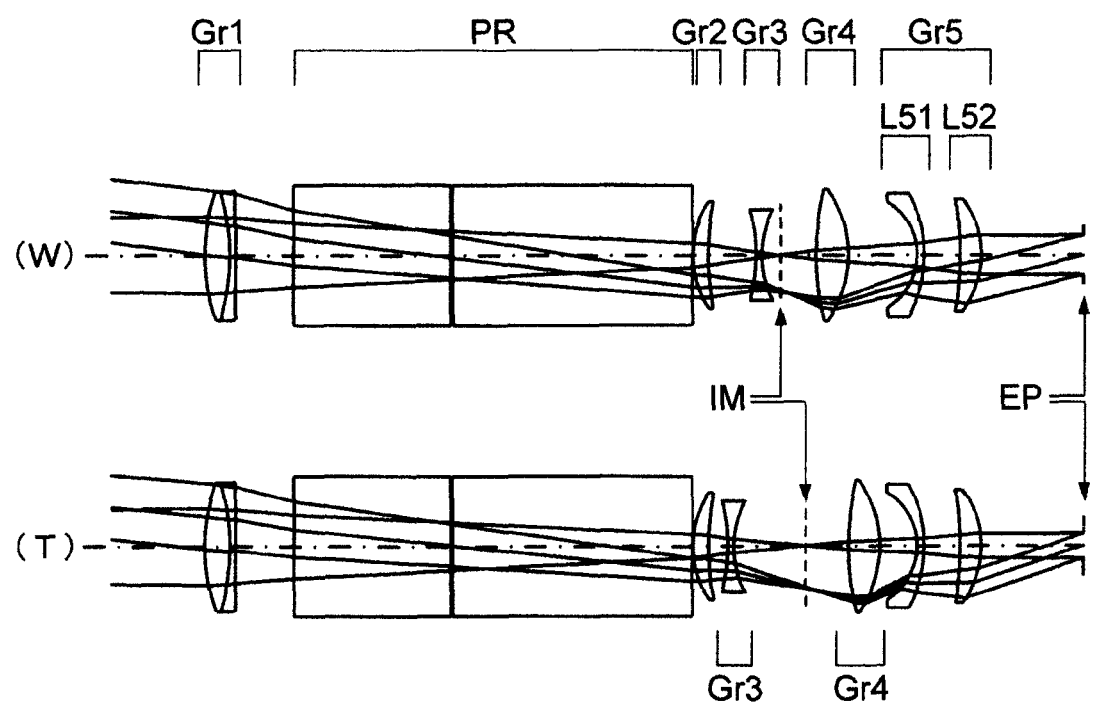
FIG. 5 is an optical path diagram according to the first embodiment (Example 1).
Figure 6:
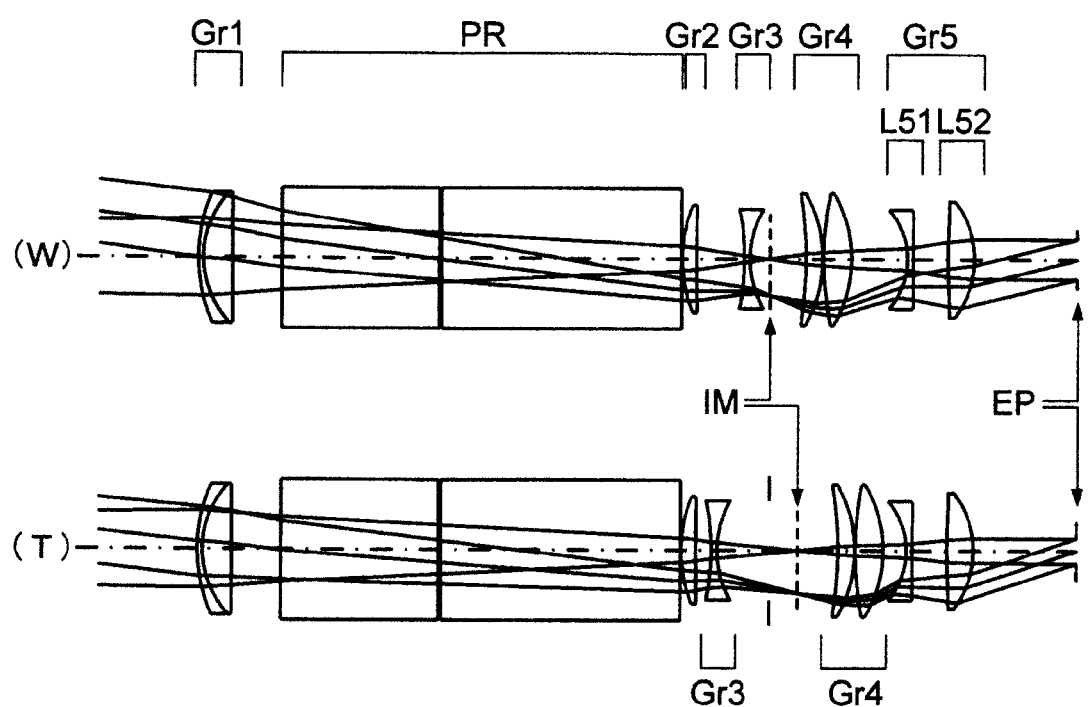
FIG. 6 is an optical path diagram according to the second embodiment (Example 2).
Figure 7:
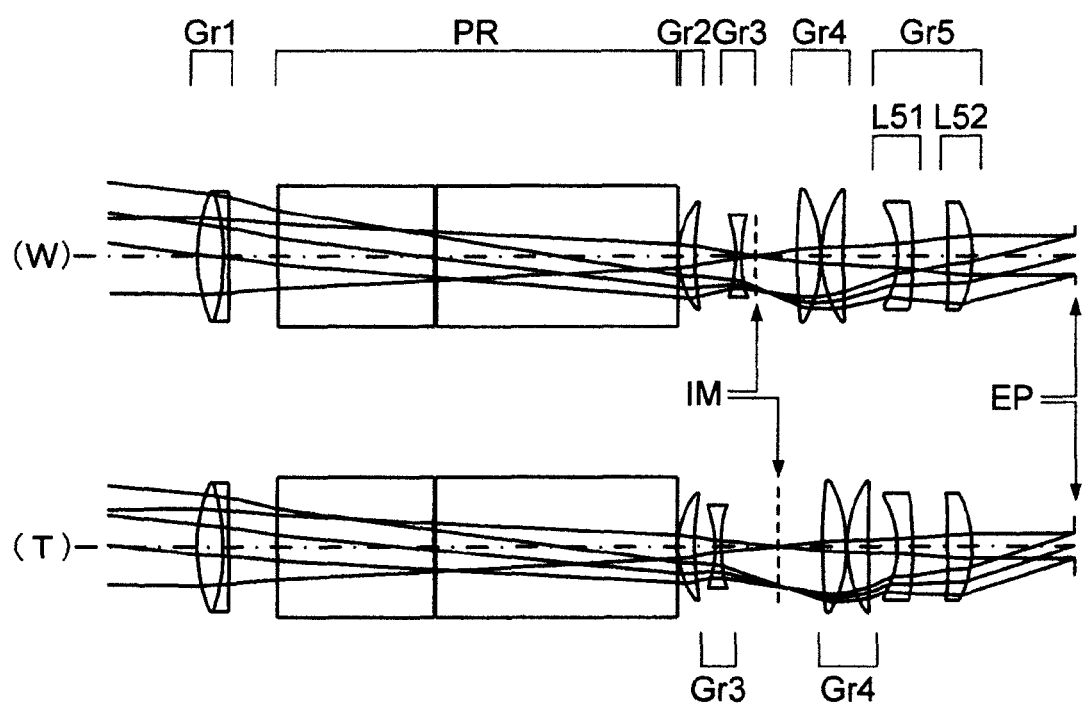
FIG. 7 is an optical path diagram according to the third embodiment (Example 3).
Figure 8:
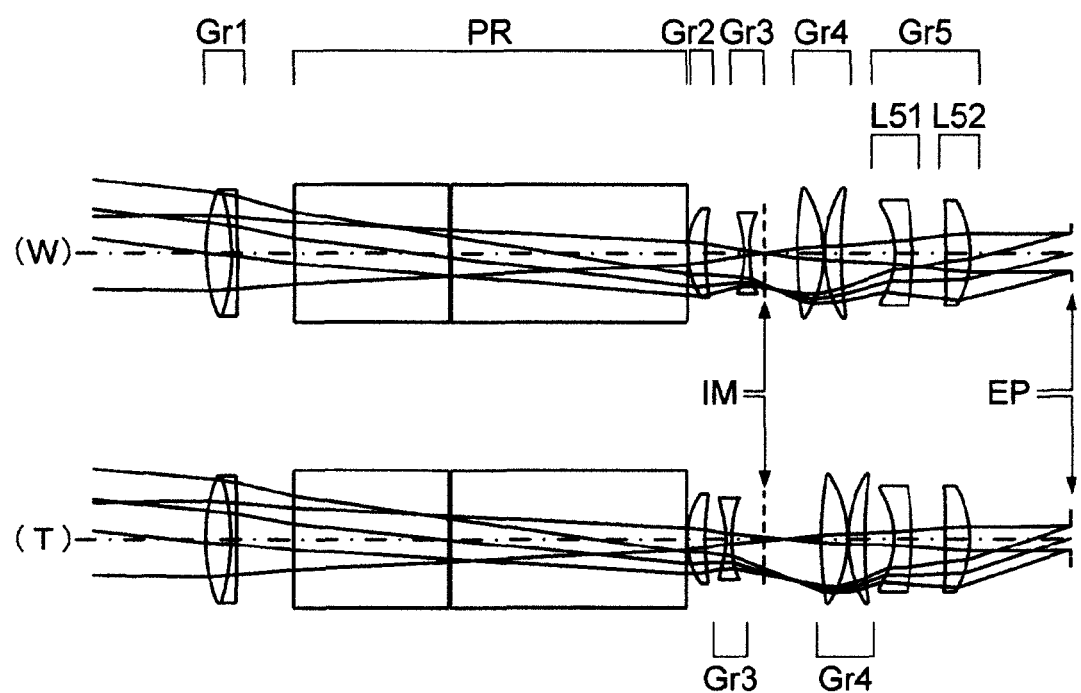
FIG. 8 is an optical path diagram according to the fourth embodiment (Example 4).

Next, a specific optical configuration of the variable-magnification observation optical system is described in more detail by way of first to fourth embodiments. FIGS. 1 to 4 are lens diagrams corresponding to variable-magnification observation optical systems LZ according to first to fourth embodiments, in which lens arrangements at the low magnification end (W) and the high magnification end (T) are depicted in an optical cross-section. FIGS. 5 to 8 are optical path diagrams corresponding to variable-magnification observation optical systems LZ according to first to fourth embodiments, in which optical paths are depicted at the low magnification end (W) and the high magnification end (T).

The variable-magnification observation optical systems LZ all have a 5-group zoom configuration of positive, positive, negative, positive, and positive. An objective system LO including a first group Gr1, a second group Gr2, and a third group Gr3 and an eyepiece system LE including a fourth group Gr4 and a fifth group Gr5 constitute a substantially afocal real image-type observation optical system, in which an erecting system PR located between the first group Gr1 and the second group Gr2 allows observation of an erect image IM through a pupil EP (FIGS. 1 to 8). In zooming from the low magnification end (W) to the high magnification end (T), the magnification is varied (i.e., zooming is performed) by moving the third group Gr3 and the fourth group Gr4 in opposite directions along an optical axis AX so that the image plane IM is located between the third group Gr3 and the fourth group Gr4. That is, in zooming from the low magnification end (W) to the high magnification end (T), the third group Gr3 moves toward an object and the fourth group Gr4 moves toward the pupil EP. Arrows m3 and m4 in FIGS. 1 to 4 schematically indicate the movements of the third group Gr3 and the fourth group Gr4 in zooming from the low magnification end (W) to the high magnification end (T), respectively.

The erecting system PR includes, for example, two glass prisms. Outside the lens closest to an object and the lens closest to the pupil EP, a transparent cover member may be provided to protect from scratches, chemicals, and the like. The lens configurations according to the respective embodiments are described below. It is noted that all powers are the values alongside of the axis.

A variable-magnification observation optical system according to a first embodiment (FIGS. 1 and 5) includes: in order from the object side, a first group Gr1 including a doublet lens of a positive lens and a negative lens and having positive power in total;

an erecting system PR;

a second group Gr2 including a positive meniscus lens having a convex surface facing an object;

a third group Gr3 including a biconcave negative lens, a fourth group Gr4 including a biconvex positive lens having a more curved surface facing the pupil surface EP; and a fifth group Gr5 including a lens 5-1 L51 and a lens 5-2 L52.

The lens 5-1 L51 is a negative meniscus lens having a concave surface facing an object; and the lens 5-2 L52 is a positive lens having a concave surface facing an object and spaced from the lens 5-1 L51 with a certain air gap therebetween. The object-side surface of the lens 5-2 L52 is aspheric.

A variable-magnification observation optical system according to a second embodiment (FIGS. 2 and 6) includes: in order from the object side, a first group Gr1 including a doublet lens of a negative meniscus lens and a positive lens and having positive power in total;

an erecting system PR;

a second group Gr2 including a positive meniscus lens having a convex surface facing an object;

a third group Gr3 including a biconcave negative lens;

a fourth group Gr4 including a positive meniscus lens having a concave surface facing an object and a biconvex positive lens; and a fifth group Gr5 including a lens 5-1 L51 and a lens 5-2 L52.

The lens 5-1 L51 is a negative meniscus lens having a concave surface facing an object; and the lens 5-2 L52 is a biconvex positive lens spaced from the lens 5-1 L51 with a certain air gap therebetween. Both surfaces of the lens 5-2 L52 are aspheric.

A variable-magnification observation optical system according to a third embodiment (FIGS. 3 and 7) includes: in order from the object side, a first group Gr1 including a doublet lens of a positive lens and a negative lens and having positive power in total;

an erecting system PR;

a second group Gr2 including a positive meniscus lens having a convex surface facing an object;

a third group Gr3 including a biconcave negative lens;

a fourth group Gr4 including two biconvex positive lenses; and a fifth group Gr5 including a lens 5-1 L51 and a lens 5-2 L52.

The lens 5-1 L51 is a negative meniscus lens having a concave surface facing an object; and the lens 5-2 L52 is a positive lens having a concave surface facing an object and spaced from the lens 5-1 L51 with a certain air gap therebetween. Both surfaces of the negative lens and both surfaces of the lens 5-2 L52 in the third group Gr3 are aspheric.

A variable-magnification observation optical system according to a fourth embodiment (FIGS. 4 and 8) includes: in order from the object side, a first group Gr1 including a doublet lens of a positive lens and a negative lens and having positive power in total;

an erecting system PR;

a second group Gr2 including a positive meniscus lens having a convex surface facing an object;

a third group Gr3 including a biconcave negative lens;

a fourth group Gr4 including a biconvex positive lens and a positive meniscus lens having a convex surface facing an object;

a fifth group Gr5 including a lens 5-1 L51 and a lens 5-2 L52.

The lens 5-1 L51 is a negative meniscus lens having a concave surface facing an object; and the lens 5-2 L52 is a biconvex positive lens spaced from the lens 5-1 L51 with a certain air gap therebetween. Both surfaces of the negative lens and both surfaces of the lens 5-2 L52 in the third group Gr3 are aspheric.

EXAMPLES

The configurations and the like of the variable-magnification observation optical systems according to the present invention will be more specifically described below by illustrating construction data of Examples and the like. Examples 1 to 4 (EXs 1 to 4) illustrated here are numerical examples corresponding to the first to fourth embodiments described above. The optical diagrams (FIGS. 1 to 4) and the optical path diagrams (FIGS. 5 to 8) indicating the first to fourth embodiments indicate the lens configurations, the optical paths, and the like of the corresponding Examples 1 to 4, respectively.

The construction data of each Example includes the surface number, the paraxial radius r of curvature (mm), the axial surface distance d (mm), the refractive index nd for the d line (wavelength 587.56 nm), and the Abbe number vd for the d line in order from left as surface data. The total length TL (mm) represents the distance between the lens surface closest to an object and the pupil surface EP.

The surfaces of surface numbers with mark * are aspheric, and the surface profiles are defined in accordance with the following formula (AS) using a local rectangular coordinate system (x, y, z) with a surface vertex as an origin. The aspheric surface data includes aspheric surface coefficient. The coefficient in the section with no aspheric surface data in Examples is 0. For all data, E–n=×10$^{-n}$.

$$z = (C \cdot h^2)/[1 + \sqrt{\{1-(1+k)C^2 \cdot h^2\}}] + A4 \cdot h^4 + A6 \cdot h^6 + A8 \cdot h^8 + A10 \cdot h^{10} \quad \text{(AS)}$$

wherein h: the height in the perpendicular direction to the z axis (optical axis AX) ($h^2 = x^2 + y^2$), z: the displacement in the direction of the optical axis AX at the height h (based on the surface vertex), C: the paraxial curvature at the surface vertex (the reciprocal of the paraxial radius r of curvature), k: the constant of the cone, A4, A6, A8, A10: the fourth, sixth, eighth, tenth aspheric coefficient, respectively, As various data, magnification (time), diopter (Dpt), object distance (mm), coverage (mm), and variable surface distances D1 to D4 (mm) are described at the low magnification end (W) and the high magnification end (T). Table 1 lists the values corresponding to the conditional equations in Examples, and Table 2 (Table for various data) lists the associated data and the like. Various data is based on the values for the e line, f1 to f5: the focal length of the first to fifth groups, fw: the focal length of the entire system at the low magnification end, ft: the focal length of the entire system at the high magnification end, fow: the focal length of the objective system at the low magnification end, fot: the focal length of the objective system at the high magnification end, few: the focal length of the eyepiece system at the low magnification end, fet: the focal length of the eyepiece system at the high magnification end, f34w: the composite focal length of the third group and the fourth group at the low magnification end, f34t: the composite focal length of the third group and the fourth group at the high magnification end, fL51: the focal length of the lens 5-1, fL52: the focal length of the lens 5-2, LT5: the distance on the optical axis between the pupil-side surface of the lens 5-1 and the object-side surface of the lens 5-2, Ra: the radius of curvature of the object-side surface of the lens 5-1, Rb: the radius of curvature of the pupil-side surface of the lens 5-1.

Figure 9:
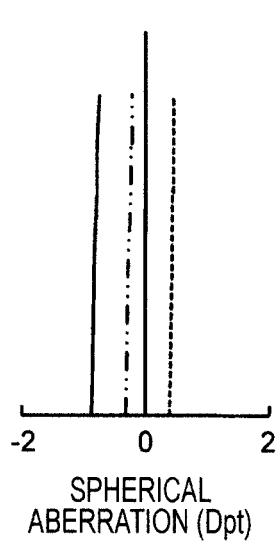
FIG. 9 is an aberration diagram according to Example 1.
Figure 9:
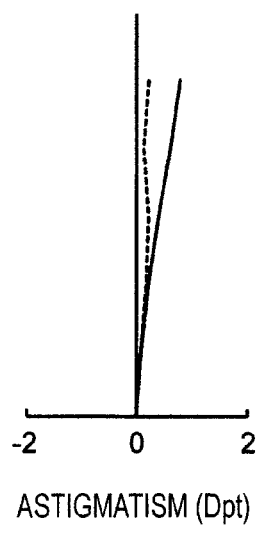
Figure 9:
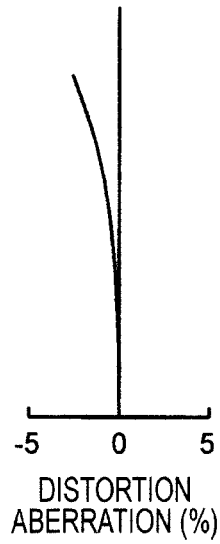
Figure 9:
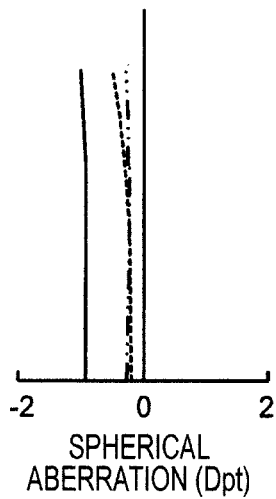
Figure 9:
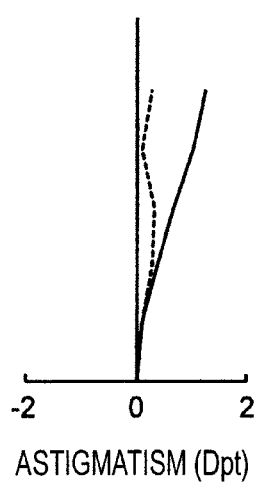
Figure 9:
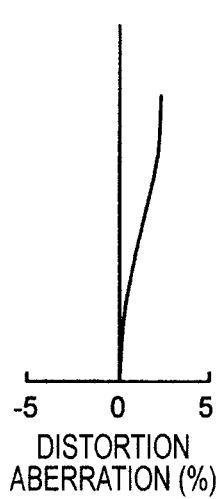
Figure 10:
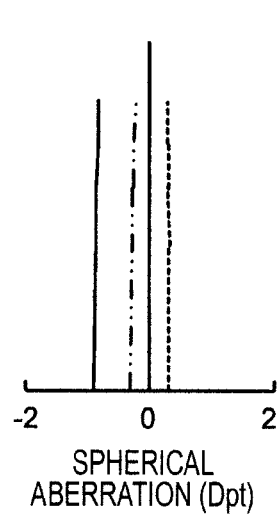
FIG. 10 is an aberration diagram according to Example 2.
Figure 10:
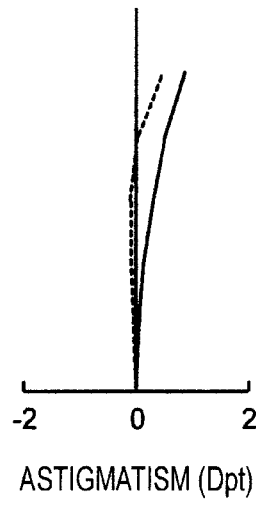
Figure 10:
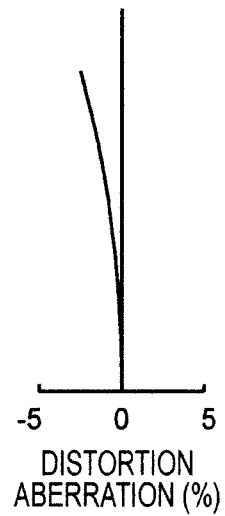
Figure 10:
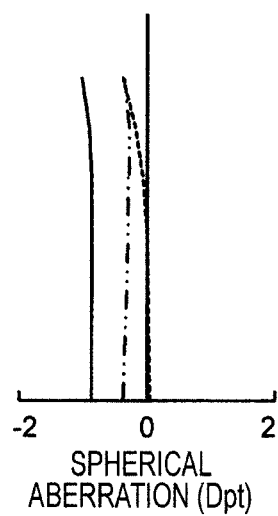
Figure 10:
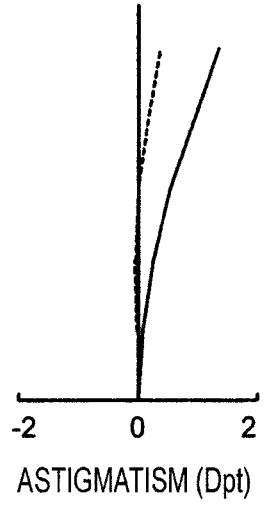
Figure 10:
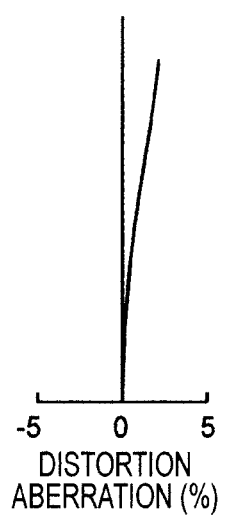
Figure 11:
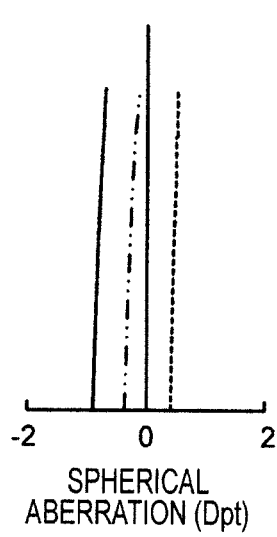
FIG. 11 is an aberration diagram according to Example 3.
Figure 11:
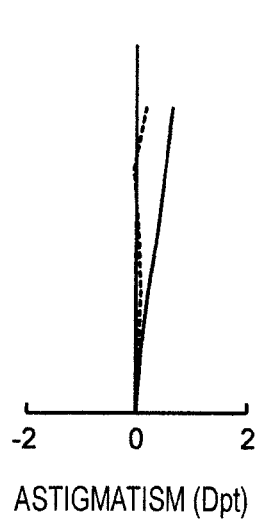
Figure 11:
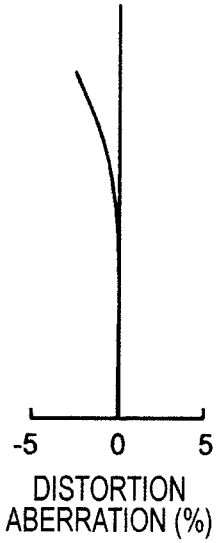
Figure 11:
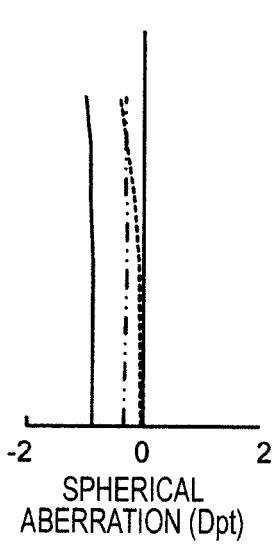
Figure 11:
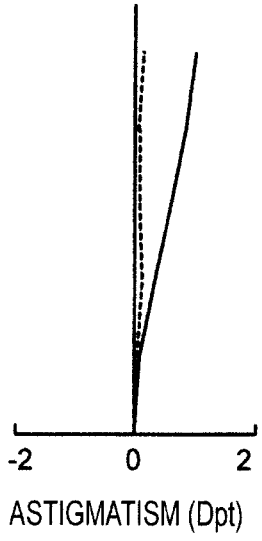
Figure 11:
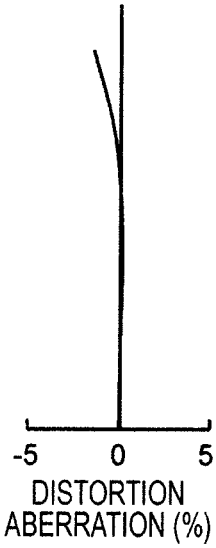
Figure 12:
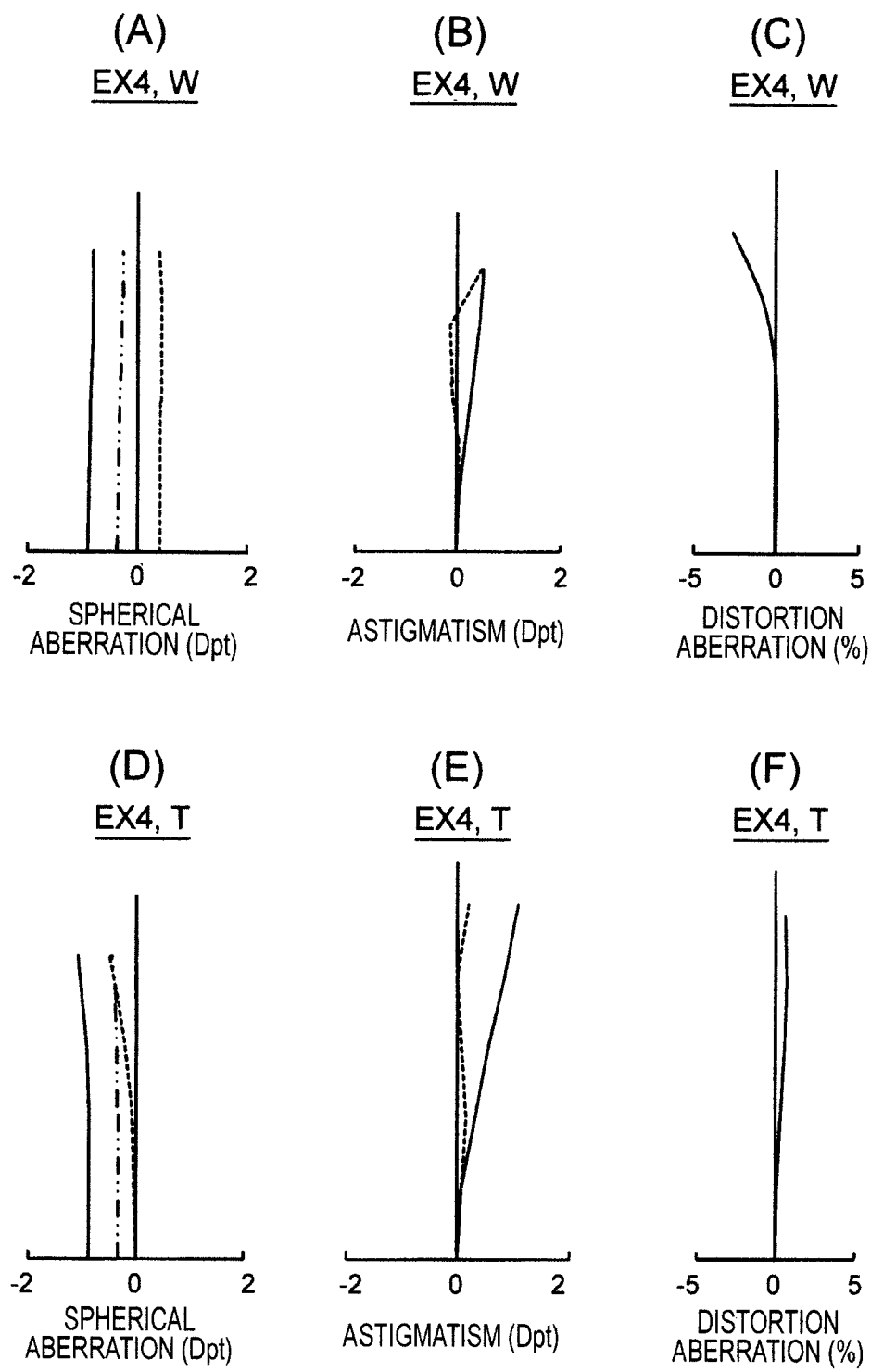
FIG. 12 is an aberration diagram according to Example 4.

FIGS. 9 to 12 are aberration diagrams corresponding to Examples 1 to 4 (EX 1 to EX 4), where (A) to (C) indicate aberrations at the low magnification end (W), and (D) to (F) indicate aberrations at the high magnification end (T) (spherical aberration, astigmatism, and distortion aberration in order from the left) (ordinate: pupil radius etc.). In the spherical aberration diagrams (A) and (D), the solid line, broken line, and chain double-dashed line indicate the spherical aberrations (Dpt) for the e line, g line, and C line, respectively. In the astigmatism diagrams (B) and (E), the broken line and solid line indicate the astigmatism (Dpt) on the tangential surface and sagittal surface, respectively. In the distortion aberration diagrams (C) and (F), the solid line indicates the distortion (%).

Example 1

| | | Unit: mm | | |
|---|---|---|---|---|
| | | Surface data | | |
| Surface number | r | d | nd | νd |
| 1 | 24.139 | 2.997 | 1.61800 | 63.40 |
| 2 | −28.114 | 0.700 | 1.80610 | 33.30 |
| 3 | −772.902 | 7.100 | | |
| 4 | ∞ | 19.195 | 1.65844 | 50.90 |
| 5 | ∞ | 0.200 | | |
| 6 | ∞ | 29.292 | 1.65844 | 50.90 |
| 7 | ∞ | 0.100 | | |
| 8 | 11.857 | 1.866 | 1.83481 | 42.70 |
| 9 | 35.189 | D1 | | |
| 10 | −21.657 | 0.700 | 1.51680 | 64.20 |
| 11 | 11.997 | D2 | | |
| 12 (Intermediate image plane) | ∞ | D3 | | |
| 13 | 35.087 | 3.855 | 1.83481 | 42.70 |
| 14 | −14.046 | D4 | | |
| 15 | −7.657 | 0.920 | 1.84666 | 23.78 |
| 16 | −15.494 | 4.318 | | |
| 17* | −58.113 | 2.635 | 1.80400 | 43.60 |
| 18 | −11.311 | 12.500 | | |
| 19 (Pupil) | ∞ | | | |
| | | TL = 107.090 | | |

| | | Aspheric surface data | | |
|---|---|---|---|---|
| Surface number | k | A4 | A6 | A8 | A10 |
| 17 | 0 | −5.915E−05 | −1.203E−06 | 3.139E−08 | −2.974E−10 |

| Various data | | |
|---|---|---|
| Magnification (time) | 2.5 | 4 |
| Diopter (Dpt) | −0.9 | −0.9 |
| Object distance (mm) | 380 | 380 |
| Coverage (mm) | φ100 | φ80 |
| D1 | 5.744 | 2.326 |
| D2 | 2.262 | 8.697 |
| D3 | 4.343 | 5.188 |
| D4 | 8.363 | 4.503 |

Example 2

| | | Unit: mm | | |
|---|---|---|---|---|
| | | Surface data | | |
| Surface number | r | d | nd | νd |
| 1 | 19.704 | 0.600 | 1.62004 | 36.30 |
| 2 | 11.516 | 3.510 | 1.48749 | 70.50 |
| 3 | −1076.359 | 6.000 | | |
| 4 | ∞ | 19.114 | 1.65844 | 50.90 |
| 5 | ∞ | 0.300 | | |
| 6 | ∞ | 29.240 | 1.65844 | 50.90 |
| 7 | ∞ | 0.100 | | |

-continued

| Unit: mm | | | | |
|---|---|---|---|---|
| 8 | 16.362 | 1.814 | 1.83481 | 42.70 |
| 9 | 411.855 | D1 | | |
| 10 | −28.166 | 0.700 | 1.51680 | 64.20 |
| 11 | 11.850 | D2 | | |
| 12 (Intermediate image plane) | ∞ | D3 | | |
| 13 | −46.791 | 2.043 | 1.77250 | 49.60 |
| 14 | −16.146 | 0.100 | | |
| 15 | 41.333 | 3.389 | 1.68893 | 31.20 |
| 16 | −15.678 | D4 | | |
| 17 | −9.294 | 0.705 | 1.80518 | 25.50 |
| 18 | 1204.785 | 4.255 | | |
| 19* | 77.752 | 3.225 | 1.69350 | 53.20 |
| 20* | −11.278 | 12.500 | | |
| 21 (Pupil) | ∞ | | | |
| | | TL = 107.090 | | |

| Aspheric surface data | | | | | |
|---|---|---|---|---|---|
| Surface number | k | A4 | A6 | A8 | A10 |
| 19 | 0 | −3.962E−05 | −1.372E−08 | −2.996E−08 | 3.822E−10 |
| 20 | 0 | 5.475E−05 | −4.938E−07 | −3.586E−09 | 7.917E−11 |

| Various data | | |
|---|---|---|
| Magnification (time) | 2.5 | 4 |
| Diopter (Dpt) | −0.9 | −0.9 |
| Object distance (mm) | 380 | 380 |
| Coverage (mm) | φ100 | φ80 |
| D1 | 5.857 | 1.919 |
| D2 | 2.440 | 9.836 |
| D3 | 4.429 | 4.963 |
| D4 | 6.770 | 2.779 |

Example 3

| Unit: mm | | | | |
|---|---|---|---|---|
| Surface number | r | d | nd | νd |
| 1 | 20.285 | 3.149 | 1.56384 | 60.80 |
| 2 | −26.519 | 0.700 | 1.80610 | 33.30 |
| 3 | −466.660 | 6.004 | | |
| 4 | ∞ | 19.195 | 1.65844 | 50.90 |
| 5 | ∞ | 0.200 | | |
| 6 | ∞ | 29.292 | 1.65844 | 50.90 |
| 7 | ∞ | 0.100 | | |
| 8 | 10.352 | 2.086 | 1.83481 | 42.70 |
| 9 | 38.950 | D1 | | |
| 10* | −11.527 | 0.700 | 1.74320 | 49.30 |
| 11* | 21.304 | D2 | | |
| 12 (Intermediate image plane) | ∞ | D3 | | |
| 13 | 81.032 | 2.880 | 1.80610 | 33.30 |
| 14 | −17.178 | 0.100 | | |
| 15 | 14.509 | 2.629 | 1.51680 | 64.20 |
| 16 | 374.505 | D4 | | |
| 17 | −11.656 | 1.946 | 1.80518 | 25.50 |
| 18 | −42.341 | 4.205 | | |
| 19* | −573.521 | 3.016 | 1.74320 | 49.30 |
| 20* | −13.673 | 12.500 | | |
| 21 (Pupil) | ∞ | | | |
| | | TL = 107.090 | | |

| Aspheric surface data | | | | | |
|---|---|---|---|---|---|
| Surface number | k | A4 | A6 | A8 | A10 |
| 10 | 0 | 1.581E−04 | 4.700E−06 | 6.111E−07 | −1.060E−08 |
| 11 | 0 | −1.326E−04 | 5.334E−06 | 2.354E−07 | 7.089E−09 |

-continued

| Unit: mm | | | | |
|---|---|---|---|---|
| 19 | 0 | −3.519E−05 | −5.426E−07 | 1.051E−09 | −4.744E−10 |
| 20 | 0 | 2.063E−05 | 3.498E−08 | −1.638E−08 | −1.353E−10 |

| Various data | | |
|---|---|---|
| Magnification (time) | 2.5 | 4 |
| Diopter (Dpt) | −0.9 | −0.9 |
| Object distance (mm) | 380 | 380 |
| Coverage (mm) | φ100 | φ80 |
| D1 | 4.938 | 2.491 |
| D2 | 1.788 | 6.953 |
| D3 | 4.991 | 5.423 |
| D4 | 6.671 | 3.522 |

Example 4

| Unit: mm | | | | |
|---|---|---|---|---|
| Surface data | | | | |
| Surface number | r | d | nd | vd |
| 1 | 20.710 | 3.142 | 1.56384 | 60.83 |
| 2 | −26.382 | 0.700 | 1.80610 | 33.30 |
| 3 | −378.352 | 7.100 | | |
| 4 | ∞ | 19.195 | 1.65844 | 50.90 |
| 5 | ∞ | 0.200 | | |
| 6 | ∞ | 29.292 | 1.65844 | 50.90 |
| 7 | ∞ | 0.100 | | |
| 8 | 9.820 | 2.230 | 1.83481 | 42.70 |
| 9 | 32.974 | D1 | | |
| 10* | −10.942 | 0.700 | 1.74320 | 49.30 |
| 11* | 19.022 | D2 | | |
| 12 (Intermediate image plane) | ∞ | D3 | | |
| 13 | 47.702 | 3.263 | 1.80610 | 33.30 |
| 14 | −15.368 | 0.100 | | |
| 15 | 16.338 | 2.035 | 1.51680 | 64.20 |
| 16 | 60.217 | D4 | | |
| 17 | −11.028 | 2.200 | 1.80518 | 25.46 |
| 18 | −40.783 | 4.095 | | |
| 19* | 602.522 | 3.075 | 1.74320 | 49.30 |
| 20* | −13.206 | 12.500 | | |
| 21 (Pupil) | ∞ | | | |
| | TL = 107.090 | | | |

| Aspheric surface data | | | | | |
|---|---|---|---|---|---|
| Surface number | k | A4 | A6 | A8 | A10 |
| 10 | 0 | 2.309E−04 | 6.670E−06 | 1.079E−06 | −3.090E−08 |
| 11 | 0 | −1.560E−04 | 1.451E−05 | 5.165E−07 | −7.171E−09 |
| 19 | 0 | −3.448E−05 | −5.906E−07 | −3.897E−09 | −6.136E−10 |
| 20 | 0 | 2.464E−05 | 1.227E−08 | −1.969E−08 | −2.497E−10 |

| Various data | | |
|---|---|---|
| Magnification (time) | 2.5 | 4 |
| Diopter (Dpt) | −0.9 | −0.9 |
| Object distance (mm) | 380 | 380 |
| Coverage (mm) | φ100 | φ80 |
| D1 | 4.704 | 2.547 |
| D2 | 1.800 | 6.320 |
| D3 | 4.004 | 4.646 |
| D4 | 6.656 | 3.650 |

TABLE 1

| Conditional equation | | Example 1 | Example 2 | Example 3 | Example 4 |
|---|---|---|---|---|---|
| (1) | LT5/few | 0.24 | 0.24 | 0.25 | 0.24 |
| (2) | f4/few | 0.69 | 0.63 | 0.67 | 0.65 |
| (3) | (Rb + Ra)/(Rb − Ra) | 2.95 | 0.98 | 1.76 | 1.74 |
| (4) | f34t/f34w | 0.60 | 0.64 | 0.57 | 0.53 |
| (5) | DA1 | ≥1.2, <2.2 | <0.20 | ≥0.2, <0.35 | ≥0.2, <0.35 |
| (6) | Hk1 | 595 | 530 | 605 | 605 |
| (7) | DS1 | ≥0.4, <0.6 | <0.2 | <0.2 | <0.2 |

TABLE 2

| Table for various data | | | Example 1 | Example 2 | Example 3 | Example 4 |
|---|---|---|---|---|---|---|
| Focal length (mm) of each group | | f1 | 49.50 | 48.73 | 48.10 | 48.68 |
| | | f2 | 20.55 | 20.26 | 16.25 | 30.44 |
| | | f3 | −14.78 | −15.98 | −9.93 | −9.21 |
| | | f4 | 12.39 | 11.10 | 11.07 | 10.91 |
| | | f5 | 35.69 | 49.07 | 41.65 | 35.35 |
| Focal length (mm) of entire system | Low magnification | fw | −214.78 | −214.58 | −215.23 | −215.27 |
| | High magnification | ft | −127.68 | −122.73 | −127.43 | −127.42 |
| Focal length (mm) of objective system (Grs 1 to 3) | Low magnification | fow | 31.53 | 31.55 | 28.68 | 28.81 |
| | High magnification | fot | 40.63 | 41.58 | 37.59 | 37.01 |
| Focal length (mm) of eyepiece system (Grs 4 to 5) | Low magnification | few | 18.0 | 17.7 | 16.6 | 16.9 |
| | High magnification | fet | 15.5 | 15.6 | 14.9 | 14.9 |
| Composite focal length (mm) of third and fourth groups (Grs 3 to 4) | Low magnification | f34w | 17.1 | 12.5 | 15.0 | 17.4 |
| | High magnification | f34t | 10.2 | 8.0 | 8.5 | 9.2 |
| Focal length (mm) of 151 | | fL51 | −18.72 | −11.35 | −20.37 | −19.24 |
| Focal length (mm) of 152 | | fL52 | 16.95 | 14.35 | 18.71 | 17.34 |
| Distance (mm) between 151 and 152 | | LT5 | 4.318 | 4.255 | 4.205 | 4.095 |
| Radius (mm) of curvature of 151 | Object side | Ra | −7.66 | −9.29 | −11.66 | −11.03 |
| | Pupil side | Rb | −15.49 | 1204.78 | −42.34 | −40.78 |

REFERENCE SIGNS LIST

LZ Variable-magnification observation optical system
LO Objective system
LE Eyepiece system
PR Erecting system
Gr1 First group
Gr2 Second group
Gr3 Third group
Gr4 Fourth group
Gr5 Fifth group
L51 Lens 5-1 (negative meniscus lens)
L52 Lens 5-2 (positive lens)
IM Image plane (erect image)
EP Pupil
AX Optical axis

The invention claimed is:

1. A variable-magnification observation optical system comprising:
   an objective system;
   an erecting system that erects an inverted image formed by the objective system; and
   an eyepiece system that allows the erect image formed by the erecting system to be observed through a pupil,
   wherein the objective system includes a first group having positive power, a second group having positive power, and a third group having negative power in order from an object side,
   wherein the eyepiece system includes a fourth group having positive power and a fifth group having positive power in order from the object side,
   wherein the erecting system is located between the first group and the second group,
   wherein zooming from a low magnification end to a large magnification end involves moving the third group and the fourth group in opposite directions along an optical axis while locating an image plane between the third group and the fourth group,
   wherein the fifth group consists of, in order from the object side, a negative meniscus lens and a positive lens with an air gap therebetween, the negative meniscus lens having a concave surface facing the object, and
   wherein the fifth group has at least one aspheric surface.

2. The variable-magnification observation optical system according to claim 1, wherein the second group and the third group each includes a single lens.

3. The variable-magnification observation optical system according to claim 2, wherein the fourth group includes only a positive lens.

4. The variable-magnification observation optical system according to claim 2, which satisfies the following conditional equation (1):

$$0.2 < LT5/few < 0.3 \quad (1)$$

wherein:
   LT5 is a distance on an optical axis between a pupil-side surface of a lens 5-1 and an object-side surface of a lens 5-2,
   provided that the negative meniscus lens in the fifth group is defined as the lens 5-1 and the positive lens in the fifth group as the lens 5-2, and
   few is a focal length of the eyepiece system at the low magnification end.

5. The variable-magnification observation optical system according to claim 2, which satisfies the following conditional equation (2):

$$0.5 < f4/few < 0.8 \quad (2)$$

wherein:
   f4 is a focal length of the fourth group, and
   few is a focal length of the eyepiece system at the low magnification end.

6. The variable-magnification observation optical system according to claim 2, which satisfies the following conditional equation (3):

$$0.5<(Rb+Ra)/(Rb-Ra)<3.5 \quad (3)$$

wherein:
Ra is a radius of curvature of an object-side surface of the lens 5-1, and
Rb is a radius of curvature of a pupil-side surface of the lens 5-1,
provided that the negative meniscus lens in the fifth group is defined as the lens 5-1.

7. The variable-magnification observation optical system according to claim 2, which satisfies the following conditional equation (4):

$$0.4<f34t/f34w<0.8 \quad (4)$$

wherein:
f34w is a composite focal length of the third group and the fourth group at the low magnification end, and
f34 is a composite focal length of the third group and the fourth group at the high magnification end.

8. The variable-magnification observation optical system according to claim 2, wherein the first, second, and fifth groups are fixed in an optical axis direction during zooming.

9. The variable-magnification observation optical system according to claim 1, wherein the fourth group includes only a positive lens.

10. The variable-magnification observation optical system according to claim 9, which satisfies the following conditional equation (1):

$$0.2<LT5/\text{few}<0.3 \quad (1)$$

wherein:
LT5 is a distance on an optical axis between a pupil-side surface of a lens 5-1 and an object-side surface of a lens 5-2,
provided that the negative meniscus lens in the fifth group is defined as the lens 5-1 and the positive lens in the fifth group as the lens 5-2, and
few is a focal length of the eyepiece system at the low magnification end.

11. The variable-magnification observation optical system according to claim 9, which satisfies the following conditional equation (2):

$$0.5<f4/\text{few}<0.8 \quad (2)$$

wherein:
f4 is a focal length of the fourth group, and
few is a focal length of the eyepiece system at the low magnification end.

12. The variable-magnification observation optical system according to claim 9, which satisfies the following conditional equation (3):

$$0.5<(Rb+Ra)/(Rb-Ra)<3.5 \quad (3)$$

wherein:
Ra is a radius of curvature of an object-side surface of the lens 5-1, and
Rb is a radius of curvature of a pupil-side surface of the lens 5-1,
provided that the negative meniscus lens in the fifth group is defined as the lens 5-1.

13. The variable-magnification observation optical system according to claim 9, which satisfies the following conditional equation (4):

$$0.4<f34t/f34w<0.8 \quad (4)$$

wherein:
f34w is a composite focal length of the third group and the fourth group at the low magnification end, and
f34t is a composite focal length of the third group and the fourth group at the high magnification end.

14. The variable-magnification observation optical system according to claim 9, wherein the first, second, and fifth groups are fixed in an optical axis direction during zooming.

15. The variable-magnification observation optical system according to claim 1, which satisfies the following conditional equation (3):

$$0.5<(Rb+Ra)/(Rb-Ra)<3.5 \quad (3)$$

wherein:
Ra is a radius of curvature of an object-side surface of the lens 5-1, and
Rb is a radius of curvature of a pupil-side surface of the lens 5-1,
provided that the negative meniscus lens in the fifth group is defined as the lens 5-1.

16. The variable-magnification observation optical system according to claim 1, wherein the first, second, and fifth groups are fixed in an optical axis direction during zooming.

17. A variable-magnification observation optical system comprising:
an objective system;
an erecting system that erects an inverted image formed by the objective system; and
an eyepiece system that allows the erect image formed by the erecting system to be observed through a pupil,
wherein the objective system includes a first group having positive power, a second group having positive power, and a third group having negative power in order from an object side,
wherein the eyepiece system includes a fourth group having positive power and a fifth group having positive power in order from the object side,
wherein the erecting system is located between the first group and the second group,
wherein zooming from a low magnification end to a large magnification end involves moving the third group and the fourth group in opposite directions along an optical axis while locating an image plane between the third group and the fourth group,
wherein the fifth group includes, in order from the object side, a negative meniscus lens and a positive lens with an air gap therebetween, the negative meniscus lens having a concave surface facing the object, and
wherein the fifth group has at least one aspheric surface which satisfies the following conditional equation (1):

$$0.2<LT5/\text{few}<0.3 \quad (1)$$

wherein:
LT5 is a distance on an optical axis between a pupil-side surface of a lens 5-1 and an object-side surface of a lens 5-2,
provided that the negative meniscus lens in the fifth group is defined as the lens 5-1 and the positive lens in the fifth group as the lens 5-2, and
few is a focal length of the eyepiece system at the low magnification end.

18. The variable-magnification observation optical system according to claim 17, which satisfies the following conditional equation (2):

$$0.5<f4/\text{few}<0.8 \quad (2)$$

wherein:
f4 is a focal length of the fourth group.

19. A variable-magnification observation optical system comprising:
an objective system;
an erecting system that erects an inverted image formed by the objective system; and
an eyepiece system that allows the erect image formed by the erecting system to be observed through a pupil,
wherein the objective system includes a first group having positive power, a second group having positive power, and a third group having negative power in order from an object side,
wherein the eyepiece system includes a fourth group having positive power and a fifth group having positive power in order from the object side,
wherein the erecting system is located between the first group and the second group,
wherein zooming from a low magnification end to a large magnification end involves moving the third group and the fourth group in opposite directions along an optical axis while locating an image plane between the third group and the fourth group,
wherein the fifth group includes, in order from the object side, a negative meniscus lens and a positive lens with an air gap therebetween, the negative meniscus lens having a concave surface facing the object, and
wherein the fifth group has at least one aspheric surface, which satisfies the following conditional equation (2):

$$0.5 < f4/few < 0.8 \quad (2)$$

wherein:
f4 is a focal length of the fourth group, and
few is a focal length of the eyepiece system at the low magnification end.

20. A variable-magnification observation optical system comprising:
an objective system;
an erecting system that erects an inverted image formed by the objective system; and
an eyepiece system that allows the erect image formed by the erecting system to be observed through a pupil,
wherein the objective system includes a first group having positive power, a second group having positive power, and a third group having negative power in order from an object side,
wherein the eyepiece system includes a fourth group having positive power and a fifth group having positive power in order from the object side,
wherein the erecting system is located between the first group and the second group,
wherein zooming from a low magnification end to a large magnification end involves moving the third group and the fourth group in opposite directions along an optical axis while locating an image plane between the third group and the fourth group,
wherein the fifth group includes, in order from the object side, a negative meniscus lens and a positive lens with an air gap therebetween, the negative meniscus lens having a concave surface facing the object, and
wherein the fifth group has at least one aspheric surface, which satisfies the following conditional equation (4):

$$0.4 < f34t/f34w < 0.8 \quad (4)$$

wherein:
f34w is a composite focal length of the third group and the fourth group at the low magnification end, and
f34t is a composite focal length of the third group and the fourth group at the high magnification end.

* * * * *